(12) United States Patent
Wang et al.

(10) Patent No.: US 12,146,068 B2
(45) Date of Patent: Nov. 19, 2024

(54) EASY-TO-CLEAN ANTISKID WEAR-RESISTANT FLOOR COATING, METHOD FOR PREPARING SAME AND APPLICATION THEREOF

(71) Applicant: WUHAN RESEARCH INSTITUTE OF MATERIALS PROTECTION CO., LTD, Wuhan (CN)

(72) Inventors: Yang Wang, Wuhan (CN); Xiusheng Liu, Wuhan (CN); Lanxuan Liu, Wuhan (CN); Dongdong Li, Wuhan (CN); Dongheng Wu, Wuhan (CN); Zenghui Feng, Wuhan (CN); Weihua Qin, Wuhan (CN)

( * ) Notice: Subject to any disclaimer, the term of this patent is extended or adjusted under 35 U.S.C. 154(b) by 390 days.

(21) Appl. No.: 17/561,938

(22) Filed: Dec. 25, 2021

(65) Prior Publication Data
US 2022/0119674 A1    Apr. 21, 2022

Related U.S. Application Data

(63) Continuation of application No. PCT/CN2021/109625, filed on Jul. 30, 2021.

(51) Int. Cl.
| | | |
|---|---|---|
| *C09D 175/04* | (2006.01) | |
| *C08J 7/046* | (2020.01) | |
| *E04F 15/10* | (2006.01) | |

(52) U.S. Cl.
CPC ............ *C09D 175/04* (2013.01); *C08J 7/046* (2020.01); *E04F 15/105* (2013.01); *C08J 2475/04* (2013.01); *E04F 2290/044* (2013.01)

(58) Field of Classification Search
CPC ..... C09D 175/04; C08J 7/046; C08J 2475/04; E04F 15/105
See application file for complete search history.

(56) References Cited

U.S. PATENT DOCUMENTS

2018/0265618 A1* 9/2018 Arntz .................. B32B 5/18

FOREIGN PATENT DOCUMENTS

CN    102391771 A  *  3/2012

OTHER PUBLICATIONS

CN-102391771-A with English translation (Year: 2012).*
CN-102391771-A English translation. (Year: 2012).*

* cited by examiner

*Primary Examiner* — Hai Y Zhang

(57) ABSTRACT

An easy-to-clean antiskid wear-resistant floor coating, a preparation method and an application method thereof are provided. The coating includes a coating component and a curing agent component, and the mass ratio of the coating component to the curing agent component is 100:45-70. The coating includes the following components: polyaspartic acid ester, polyester polyol or polyether polyol, a reactive catalyst, a solvent, a hydrophilic anti-staining agent, an ultraviolet absorbent, a heat stabilizer, elastic microspheres, a flame retardant, an mildew inhibitor, an anti-settling agent, defoaming agents, a leveling agent and pigments and fillers. The curing agent component includes isocyanate prepolymer and polyisocyanate. The easy-to-clean antiskid wear-resistant floor coating has good antiskid, wear-resistant, easy-to-clean and anti-contamination performances, can meet the antiskid wear-resistant protection requirements of the floor surface with higher decorative requirements, has a simple preparation method and process, and is beneficial to popularization.

7 Claims, No Drawings

EASY-TO-CLEAN ANTISKID WEAR-RESISTANT FLOOR COATING, METHOD FOR PREPARING SAME AND APPLICATION THEREOF

TECHNICAL FIELD

The disclosure relates to the technical field of industrial coatings, and more specifically, to an easy-to-clean antiskid wear-resistant floor coating, a preparation method and an application thereof.

BACKGROUND

The main function of the ground coatings is to decorate and protect the ground, but also can be given other functions, such as easy to clean, anti-skid and wear-resistant, which belong to one of the major categories. Anti-skid and wear-resistant floor coatings have been applied in pedestrian overpasses, stadiums, ship decks, offshore platforms, floating bridges and other places. Anti-skid and wear-resistant floor coatings usually need to have good anti-skid and wear-resistant properties. In addition to protecting the ground and preventing people from slipping due to trampling, some applications also require high decorative requirements, such as ships, trains, airplanes, stadiums, etc. Floor coatings in these scenes need to be easy to clean and maintain. The appearance, at the same time needs to meet the requirements of decoration.

The antiskid wear-resistant floor coating is mainly composed of film-forming resin, antiskid filler, wear-resistant filler and the like. According to the classification of film-forming resins, there are mainly epoxy, acrylic and polyurethane products. Polyurethane is polymerized by polyisocyanate and macromolecular polyol, which has excellent flexibility, impact resistance and wear resistance, and is widely used in the preparation of anti-skid and wear-resistant coatings.

Adding anti-slip fillers is the main technical means to improve the roughness and friction coefficient of anti-slip coating. The commonly used wear-resistant anti-slip fillers are mainly SiC, $Al_2O_3$, corundum sand, quartz sand, hollow or solid glass beads, which are easy to form dead corners, cause the accumulation of pollutants and are difficult to remove, resulting in the coating not easy to be cleaned and the anti-fouling performance is reduced. Therefore, it is of great significance to develop a floor coating with excellent skid resistance, wear resistance and easy cleaning and stain resistance for the floor protection of trains, ships, airplanes, stadiums and other places with high decorative requirements.

SUMMARY OF THE INVENTION

One purpose of the disclosure is to provide an easy-to-clean antiskid wear-resistant floor coating, which has good antiskid, wear-resistant, easy-to-clean and anti-contamination properties and can meet the antiskid wear-resistant protection requirements of the floor surface with higher decorative requirements.

The second purpose of the disclosure is to provide a preparation method of the easy-to-clean antiskid wear-resistant floor coating, which includes the following steps of: firstly, respectively preparing a coating component and a curing agent component, and then mixing the components according to different proportions for use; and the preparation method is simple in process and easy to produce.

The third purpose of the disclosure is to provide a method for using the easy-to-clean antiskid wear-resistant floor coating, which is suitable for various coating methods, can be used after being completely dried, does not need other processes, is convenient to operate and is beneficial to popularization.

The technical scheme adopted by the disclosure for realizing one of the purposes is that the easy-to-clean antiskid wear-resistant floor coating including a coating component and a curing agent component. The mass ratio of the coating component to the curing agent component is 100:45-70. The coating component includes the following raw materials in parts by mass:

40-60 parts of polyaspartic acid ester,
20-40 parts of polyester polyol or polyether polyol,
0.3-0.6 parts of reactive catalyst,
40-60 parts of solvent,
1-3 parts of hydrophilic anti-staining agent,
0.1-0.2 parts of ultraviolet absorbent,
0.1-0.2 parts of heat stabilizer,
20-30 parts of elastic microspheres,
2-4 parts of flame retardant,
3-6 parts of mildew inhibitor,
1-3 parts of anti-settling agent,
0.4-0.6 parts of defoaming agent,
0.4-0.6 parts of leveling agent, and
10-20 parts of filler.

The curing agent component includes the following raw materials in parts by mass:

100 parts of isocyanate prepolymer; and
3-6 part of polyisocyanate.

The easy-to-clean antiskid wear-resistant floor coating adopts the elastic polyurethane resin as a film-forming resin material, and has good strength, elasticity and wear resistance. The elastic polyurethane resin is mainly prepared from alicyclic isocyanate, aliphatic polyaspartic ester and polyester polyol or polyether polyol, and the resin molecular structure uses an alicyclic structure, but has no benzene ring structure, has excellent strength and wear resistance, and has good weather resistance. The curing agent component is prepared by firstly reacting aliphatic diisocyanate and dihydric alcohol to prepare a polyurethane prepolymer and then adding polyisocyanate when the polyisocyanate reacts with polyaspartic ester and polyester polyol or polyether polyol in the coating component. The mechanical strength, the wear resistance and the weather resistance of the coating can be further improved by providing the nodes of the cross-linked network structure.

The polyaspartic ester and the polyester polyol or the polyether polyol and the isocyanate curing agent component have moderate reaction activity, have longer mixing pot life compared with the conventional polyurethane/polyurea elastomer in the presence of a solvent, can be constructed by conventional brush coating, air spraying and roller coating, and simultaneously contribute to improving the wettability of the coating on the surface of a substrate, and the adhesive strength of the coating on the surface of the substrate is improved.

The reactive catalyst added in the coating component can effectively accelerate the reaction speed of polyether polyol and curing agent isocyanate in the coating component and accelerate the drying and curing of the coating at normal temperature. The reactive catalyst participates in the curing reaction of the coating and does not remain in a coating layer in a coating film, thereby avoiding the influence of the existence of the catalyst on the aging resistance of the coating film. The weather resistance and the thermal aging resistance of the coating are improved. The solvent in the coating composition may facilitate dissolution of the resin. The ultraviolet absorbent and the heat stabilizer in the coating component can improve the light aging resistance and the heat aging resistance of the coating. The flame retardant in the coating component has dual functions of flame retardance and plasticization, has the functions of flame retardance, heat insulation and oxygen isolation, and has less smoke generation. It is also not easy to produce toxic gases and corrosive gases. The mildew inhibitor in the coating component enables the coating to have an anti-mildew effect. The anti-settling agent in the coating component can change the rheological property of the system and prevent the pigment from settling. The defoaming agent can eliminate or inhibit bubbles in the coating and avoid defects such as bubbles or pinholes in the coating. The leveling agent can effectively reduce the surface tension of the coating, it can improve the permeability of the coating, reduce the spots and marks produced during brushing, and make the film uniform. Pigments and fillers can be used to change the color of the coating by selecting different colors of fillers according to the needs of use, so as to meet various visual effects.

In the technical scheme, the number average molecular weight of the polyaspartic acid ester is 400-600, and the number average molecular weight of the polyester polyol is 1000-6000.

In the technical scheme, the reactive catalyst is one of triethanolamine and dimethylethanolamine. The solvent is one or more of xylene, butyl acetate, acetone, butanone and toluene. The hydrophilic anti-staining agent is polyether modified polysiloxane. The ultraviolet absorbent is a hydroxyphenol benzotriazole absorbent. The heat stabilizer is a hindered phenol antioxidant. The flame retardant is a phosphate additive flame retardant. The mildew inhibitor is isothiazolinone bactericidal mildew inhibitor. The anti-settling agent is organic soil. The defoaming agent is a polysiloxane defoaming agent and the leveling agent is polyacrylate.

In that technical scheme, the elastic microsphere are polyurethane elastic microspheres, and the particle size of the polyurethane elastic microsphere is 70-100 μm.

Furthermore, the preparation method of the elastic microsphere includes the following steps:
(A1) adding the isophorone diisocyanate and the polytetrahydrofuran ether gradually into the reaction kettle, after the temperature is stable, raising the temperature is to 70-80° C. , adding dimethylol propionic acid into the reaction kettle to react for 2 hours under stirring until the reaction is completed, adding dimethylol propionic acid to continue to react for 2 hours until the reaction is complete, the mixture is cooled to normal temperature, and triethylamine is added and stirred for about 15 minutes to obtain the self-emulsifying polyurethane prepolymer.
(A2) adding deionized water and ethylenediamine into a dispersion tank, uniformly stirring at a high speed, and then gradually adding the self-emulsifying polyurethane prepolymer prepared in the step (A1) to obtain a polyurethane emulsion.
(A3) adding a calcium chloride solution with a concentration of 10% into the polyurethane emulsion prepared in the step (A2) to enable the polyurethane emulsion particles to aggregate and precipitate, and drying to obtain the polyurethane elastic microspheres.

The polyurethane elastic microspheres with the particle size of about 70 to 100 μm are added into the coating components, and when the thickness of the prepared coating is about 60 μm, smooth and transitional micro bulges can be formed on the surface of the coating. Compared with the conventional antiskid granules made of irregular hard and elastic materials, the surface roughness of the coating is improved, dead angles can be avoided, dirt accumulation can be prevented, and cleaning and maintenance are easy. At the same time, the elastic deformation generated when the micro-convex structure is stressed can increase the contact area between the coating and the sole, improving the friction coefficient and improve the anti-skid performance of the coating. The addition of the polyether modified polysiloxane hydrophilic anti-staining agent in the coating can reduce the wetting angle of water on the surface of the coating, so that the surface of the coating is easy to form a water film and has good antifouling and easy cleaning properties. When water exists, in combination with the deformation of the elastic micro-bulges under stress, the coat can generate a suction cup effect with the sole to improve the anti-skid force in a wet state. And when oil stains exist, the elastic micro-bulges deformed under stress can also generate a suction cup effect with the sole to improve the anti-skid force of the coat in an oil state.

In the technical scheme, the preparation method of the isocyanate prepolymer includes the following steps of: reacting aliphatic diisocyanate and a dihydric alcohol polymer under a heating condition to obtain the isocyanate prepolymer. The aliphatic diisocyanate is one or more of dicyclohexylmethane diisocyanate and isophorone diisocyanate. The diol polymer is one or more of polyether diol and polyester diol, the number-average molecular weight of the diol polymer is 600-2000, and the mass ratio of aliphatic diisocyanate to the diol polymers is 1:(1.2-1.8).

The technical scheme adopted by the invention for realizing the second purpose is as follows: the preparation method of the easy-to-clean antiskid wear-resistant floor coating includes the following steps of:
(B1) the polyaspartic acid ester, the polyester polyol, the reactive catalyst, the solvent, the hydrophilic anti-staining agent, the ultraviolet absorbent, the heat stabilizer, the flame retardant, the mildew preventive, the anti-settling agent, the defoaming agent, a leveling agent and the filler are stirred and dispersed uniformly at a certain rotating speed, are ground until the fineness is less than 30 μm, are added with the elastic microspheres and are stirred and dispersed uniformly at a certain rotating speed to obtain a coating component;
(B2) slowly adding the dihydric alcohol polymer into the aliphatic diisocyanate, continuously stirring, heating to a certain temperature, keeping the temperature and reacting for a certain time, and adding the polyisocyanate after cooling to obtain a curing agent component; and
(B3) uniformly mixing the coating component obtained in the step (B1) and the curing agent component obtained in the step (B2) to obtain the easy-to-clean antiskid wear-resistant floor coating.

The scheme adopted by the invention for realizing the third purpose is that the application method of the easy-to-clean antiskid wear-resistant floor coating includes the following steps of: coating the easy-to-clean antiskid wear-resistant floor coating on the surface of the floor by means of blade coating, brush coating, roller coating and spray coating. The thickness of a coating dry film is 50-70 μm. The drying and curing are carried out for 24-48 hours to obtain the easy-to-clean antiskid wear-resistant floor coating with smooth transition micro-protrusions.

The disclosure has the advantages as follows.

The easy-to-clean antiskid wear-resistant floor coating has good antiskid, wear-resistant, easy-to-clean and anti-contamination performances, can meet the antiskid wear-resistant protection requirements of the floor surface with higher decorative requirements, can improve the roughness and the friction coefficient of the antiskid coating by adding the elastic microspheres, and can prevent the movement of molecular chain segments of film-forming resin by utilizing the volume occupied by the elastic microspheres in the coating. Forming a steric hindrance effect, simultaneously improving the thermal deformation temperature and the glass transition temperature of the coating, improving the wear resistance and the antiskid performance, prolonging the service life, effectively improving the treading comfort of personnel while increasing the antiskid performance of the coating, and simultaneously reducing the wetting angle of water on the surface of the coating by adding the hydrophilic anti-staining agent, so that the surface of the coating is easy to form a water film and has good stain resistance and easy cleaning performance.

According to the preparation method of the easy-to-clean antiskid wear-resistant floor coating, the coating component and the curing agent component are prepared respectively, and when the coating is required to be used, the coating component and the curing agent component are mixed according to a certain proparts, so that the preparation method is simple in process and beneficial to popularization.

The application method of the easy-to-clean antiskid wear-resistant floor coating can adopt a number of coating modes, such as blade coating, brush coating, roller coating, spray coating and the like, and the coating can be dried and cured under natural conditions without other drying equipment, so that the operation is convenient.

DETAILED DESCRIPTION OF THE INVENTION

In the following, the technical solutions in the embodiments of the present invention will be described clearly and completely in combination with the accompanying drawings of the embodiments of the present invention. Obviously, the described embodiments are only a part of the embodiments, but not all of them. Based on the embodiments of the present invention, all other embodiments obtained by a person of ordinary skill in the art without creative efforts fall within the scope of protection of the present disclosure.

Embodiment 1

The easy-to-clean antiskid wear-resistant floor coating comprises the following components in parts by mass: 100 parts of a coating component and 45 parts of a curing agent component.

The coating component includes the following raw materials in parts by mass:
- 40 parts of polyaspartic acid ester (F520),
- 20 parts of polyether polyol (PTMG1000),
- 0.3 parts of reactive catalyst (dimethylethanolamine),
- 40 parts of solvent (xylene),
- 1 part of hydrophilic anti-staining agent (WH-326 hydrophilic additive);
- 0.1 parts of ultraviolet absorbent (hydroxyphenol benzotriazole absorbent UV-1130);
- 0.1 parts of heat stabilizer (antioxidant 245);
- 20 parts of elastic microspheres (WH-RT60 polyurethane microsphere),
- 2 parts of flame retardant (dimethyl methyl phosphonate),
- 3 part of mildew inhibitor (2-methyl-4-isothiazolin-3-ketone MIT);
- 1 part of anti-settling agent (organic soil);
- 0.4 parts of defoaming agent (polysiloxane defoaming agent BYK-A501);
- 0.4 parts of leveling agent (BYK-S706),
- 10 parts of filler.

The curing agent component includes the following raw materials in parts by mass:
- 100 parts of diisocyanate (IPDI)
- 120 parts of diol (PTMG1000)
- 6.6 parts of polyisocyanate (HDI trimer).

The preparation method of the easy-to-clean antiskid wear-resistant floor coating includes the following steps:

(B1) adding 40 parts of polyaspartic acid ester, 20 parts of polyether polyol, 0.3 part of reactive catalyst, 40 parts of solvent, 1 part of hydrophilic anti-staining agent, 0.1 part of ultraviolet absorber, 0.1 part of heat stabilizer, 2 parts of flame retardant, 3 parts of mildew preventive, 1 part of anti-settling agent, 0.4 part of defoaming agent, 0.4 part of leveling agent and 10 parts of filler into a dispersion tank, stirring at a high speed, dispersing uniformly, grinding until the fineness is less than 30 μm, then adding 20 parts of elastic microspheres, stirring at a high speed and dispersing uniformly to obtain a coating component;

(B2) adding 100 parts of aliphatic diisocyanate into a reaction kettle, continuously stir, slowly adding 120 parts of dihydric alcohol polymer into that reaction kettle, heating to 75° C. after the temperature is stable, carrying out heat preservation reaction for 1.5 hours, cooling to room temperature, and adding 6.6 parts of polyisocyanate to obtain a curing agent component;

(B3) uniformly stirring and mixing the coating component obtained in the step (B1) and the curing agent component obtained in the step (B2) in a mass ratio of 100:45 to obtain the easy-to-clean antiskid wear-resistant floor coating.

When in use, the coating is applied on the surface of the floor by means of blade coating, brush coating, roller coating, spray coating and the like, the thickness of a coating dry film is about 60 μm, and the coating is dried and cured for 24 hours at normal temperature to obtain an easy-to-clean antiskid wear-resistant floor coating with smooth transition micro-protrusions.

The obtain easy-to-clean antiskid wear-resistant floor coating has grade 0 pulverization, grade 0 crack and color difference $\Delta E=0.52$ after artificial accelerated aging for 1000 hours; Contamination resistance (use No.15 hydraulic oil: carbon black=10:1, settling for 24 h, then clean for 2 min), no visible pollutant residue; Wear resistance: 0.052 G/1000 g·10000 r; Coefficient of sliding friction: 0.83 with artificial leather, 0.78 with rubber.

Embodiment 2

The easy-to-clean antiskid wear-resistant floor coating includes the following components in parts by mass: 100 parts of coating component and 70 parts of curing agent component.

The coating component includes the following raw materials in parts by mass:
- 60 parts of polyaspartic acid ester (F420),
- 40 parts of polyester polyol (PCDL1000),
- 0.6 parts of reactive catalyst (triethanolamine),
- 60 parts of solvent (acetone), 3 parts of hydrophilic anti-staining agent (WH-326 hydrophilic additive);
0.2 parts of ultraviolet absorbent (hydroxyphenol benzotriazole absorbent UV-1130);
0.2 parts of heat stabilizer (antioxidant 245);
30 parts of elastic microspheres (WH-RT60 polyurethane microsphere),
4 parts of flame retardant (dimethyl methyl phosphonate),
6 parts of mildew inhibitor (2-methyl-4-isothiazolin-3-ketone MIT);
3 parts of anti-settling agent (organic soil),
0.6 parts of defoaming agent (polysiloxane defoaming agent BYK-A501);
0.6 parts of leveling agent (BYK-S706),
10 parts of filler, The curing agent component comprises the following raw materials in parts by mass:
100 parts of diisocyanate (HMDI)
180 parts of dihydric alcohol (PTMG1000)
16.8 parts Polyisocyanate (IPDI trimer)

The preparation method of the easy-to-clean antiskid wear-resistant floor coating includes the following steps:
(B1) adding 60 parts of polyaspartic acid ester, 40 parts of polyester polyol, 0.6 parts of reactive catalyst, 60 parts of solvent, 3 parts of hydrophilic anti-staining agent, 0.2 parts of ultraviolet absorbent, 0.2 parts of heat stabilizer, 4 parts of flame retardant, 6 parts of mildew preventive, 3 parts of anti-settling agent, 0.6 parts of defoaming agent, 0.6 parts of leveling agent and 10 parts of filler into a dispersion tank, stirring at a high speed, dispersing uniformly, grinding until the fineness is less than 30 μm, then adding 30 parts of elastic microspheres, stirring at a high speed and dispersing uniformly to obtain a coating component;
(B2) adding 100 parts of aliphatic diisocyanate into a reaction kettle, continuously stirring, slowly adding 180 parts of dihydric alcohol polymer into the reaction kettle, heating to 75° C. after the temperature is stable, carrying out heat preservation reaction for 1.5 hours, cooling to room temperature, and then adding 16.8 parts of polyisocyanate to obtain a curing agent component;
(B3) uniformly stirring and mixing the coating component obtained in the step (B1) and the curing agent component obtained in the step (B2) in a mass ratio of 100:70 to obtain the easy-to-clean antiskid wear-resistant floor coating.

When in use, the coating is applied on the surface of the floor by means of blade coating, brush coating, roller coating, spray coating and the like, the thickness of a coating dry film is about 60 μm, and the coating is dried and cured for 24 hours at normal temperature to obtain an easy-to-clean antiskid wear-resistant floor coating with smooth transition micro-protrusions.

The obtain easy-to-clean antiskid wear-resistant floor coating has grade 0 pulverization, grade 0 crack and color difference Δ E=0.32 after artificial accelerated aging for 1000 hour; Contamination resistance (use No. 15 hydraulic oil: carbon black=10:1, settling for 24 h, then clean for 2 mins), no visible pollutant residue; Wear resistance: 0.034 G/1000 g·10000 r; Coefficient of sliding friction: 0.78 with artificial leather, 0.68 with rubber.

Embodiment 3

The easy-to-clean antiskid wear-resistant floor coating includes the following components in parts by mass: 100 parts of coating component and 70 parts of curing agent component;

The coating component includes the following raw materials in parts by mass:
50 parts of polyaspartic acid ester (F520),
30 parts of polyether polyol (PTMG2000),
0.5 parts of reactive catalyst (triethanolamine),
50 parts of solvent (xylene);
2 parts of hydrophilic anti-staining agent (WH-326 hydrophilic additive);
0.15 parts of ultraviolet absorbent (hydroxyphenol benzotriazole absorbent UV-1130);
0.15 parts of heat stabilizer (antioxidant 245);
25 parts of elastic microspheres (WH-RT60 polyurethane microsphere),
3 parts of flame retardant (dimethyl methyl phosphonate),
5 parts of mildew inhibitor (2-methyl-4-isothiazolin-3-ketone MIT);
2 parts of anti-settling agent (organic soil);
0.5 parts of defoaming agent (polysiloxane defoaming agent BYK-A501);
0.5 parts of leveling agent (BYK-S706),
15 parts of filler, The curing agent component comprises the following raw materials in parts by mass:
100 parts of Diisocyanate (IPDI)
150 parts of dihydric alcohol (PTMG1000)
12.5 parts of Polyisocyanate (HDI trimer)

The preparation method of the easy-to-clean antiskid wear-resistant floor coating includes the following steps:
(B1) adding 50 parts of polyaspartic acid ester, 30 parts of polyether polyol, 0.5 parts of reactive catalyst, 50 parts of solvent, 2 parts of hydrophilic anti-staining agent, 0.15 parts of ultraviolet absorbent, 0.15 parts of heat stabilizer, 3 parts of flame retardant, 5 parts of mildew preventive, 2 parts of anti-settling agent, 0.5 parts of defoaming agent, 0.5 parts of leveling agent and 15 parts of filler into a dispersion tank, stirring at a high speed, dispersing uniformly, grinding until the fineness is less than 30 μm, adding 25 parts of elastic microspheres, and the mixture is stirred at a high speed and dispersed uniformly to obtain a coating component;
(B2) adding 100 parts of aliphatic diisocyanate into a reaction kettle, continuously stirring, slowly adding 150 parts of dihydric alcohol polymer into that reaction kettle, heating to 75° C. after the temperature is stable, carrying out heat preservation reaction for 1.5 hours, cooling to room temperature, and adding 12.5 parts of polyisocyanate to obtain a curing agent component;
(B3) uniformly stirring and mixing the coating component obtained in the step (B1) and the curing agent component obtained in the step (B2) in a mass ratio of 100:45 to obtain the easy-to-clean antiskid wear-resistant floor coating.

When in use, the coating is applied on the surface of the floor by means of blade coating, brush coating, roller coating, spray coating and the like, the thickness of a coating dry film is about 60 μm, and the coating is dried and cured for 24 hours at normal temperature to obtain an easy-to-clean antiskid wear-resistant floor coating with smooth transition micro-protrusions.

The obtain easy-to-clean antiskid wear-resistant floor coating has grade 0 pulverization, grade 0 crack and color difference Δ E=0.36 after artificial accelerated aging for 1000 hours. Contamination resistance (use No.15 hydraulic oil: carbon black=10:1, place for 24 h, then clean for 2 mins), no visible pollutant residue; Wear resistance: 0.042 G/1000 g·10000 r; Coefficient of sliding friction: 0.83 with artificial leather, 0.78 with rubber.

Embodiment 4

The easy-to-clean antiskid wear-resistant floor coating includes the following components in parts by mass: 100 parts of a coating component and 45 parts of a curing agent component.

The coating component includes the following raw materials in parts by mass:
- 40 parts of polyaspartic acid ester (F520),
- 20 parts of polyether polyol (PTMG1000),
- 0.3 parts of reactive catalyst (dimethylethanolamine),
- 40 parts of solvent (xylene),
- 1 part of hydrophilic anti-staining agent (WH-326 hydrophilic additive);
- 0.1 parts of ultraviolet absorbent (hydroxyphenol benzotriazole absorbent UV-1130);
- 0.1 parts of heat stabilizer (antioxidant 245);
- 20 parts of elastic microspheres (self-made);
- 2 parts of flame retardant (dimethyl methyl phosphonate),
- 3 parts of mildew inhibitor (2-methyl-4-isothiazolin-3-ketone MIT);
- 1 part of anti-settling agent (organic soil);
- 0.4 parts of defoaming agent (polysiloxane defoaming agent BYK-A501);
- 0.4 parts of leveling agent (BYK-S706),
- 10 parts of filler, The curing agent component comprises the following raw materials in parts by mass:
- 100 parts of diisocyanate (IPDI)
- 120 parts of diol (PTMG1000) and
- 6.6 parts of polyisocyanate (HDI trimer)

The preparation method of each part of the elastic microspheres includes the following steps of:
(A1) adding 222.29 parts of isophorone diisocyanate into a reaction kettle, gradually adding 400 parts of polytetrahydrofuran ether (PTMG1000) with the molecular weight of 1000, after the temperature is stable, heating to 75±5° C., reacting for 2 hours under stirring, adding 40 parts of dimethylolpropionic acid, continuing to react for 2 hours, cooling to normal temperature, 30 part of triethylamine was adding and stir for 15 minutes to obtain a self-emulsifying polyurethane prepolymer.
(A2) adding 1500 parts of deionized water and 18.9 parts of ethylenediamine into a dispersion tank, uniformly stirring, and gradually adding the self-emulsifying polyurethane prepolymer prepared in step (A1) while stirring at a high speed to obtain a polyurethane emulsion.
(A3) adding 333 parts of calcium chloride solution with the concentration of 10% into the polyurethane emulsion prepared in the step (A2) to ensure that polyurethane emulsion particles are aggregated and precipitated, and drying to obtain the polyurethane elastic microspheres.

The preparation method of the easy-to-clean antiskid wear-resistant floor coating includes the following steps:
(B1) adding 40 parts of polyaspartic acid ester, 20 parts of polyether polyol, 0.3 parts of reactive catalyst, 40 parts of solvent, 1 part of hydrophilic anti-staining agent, 0.1 parts of ultraviolet absorber, 0.1 parts of heat stabilizer, 2 parts of flame retardant, 3 parts of mildew preventive, 1 part of anti-settling agent, 0.4 parts of defoaming agent, 0.4 parts of leveling agent and 10 parts of filler into a dispersion tank, stirring at a high speed, dispersing uniformly, grinding until the fineness is less than 30 μm, then adding 20 parts of the elastic microspheres prepared in the step (A3), and stirring at a high speed to disperse uniformly to obtain a coating component;
(B2) adding 100 parts of aliphatic diisocyanate into a reaction kettle, continuously stir, slowly adding 120 parts of dihydric alcohol polymer into that reaction kettle, heating to 75° C. after the temperature is stable, carrying out heat preservation reaction for 1.5 hours, cooling to room temperature, and adding 6.6 parts of polyisocyanate to obtain a curing agent component;
(B3) uniformly stirring and mixing 100 parts of the coating component obtained in the step (B1) and 45 parts of the curing agent component obtained in the step (B2) to obtain the easy-to-clean antiskid wear-resistant floor coating.

When in use, the coating is applied on the surface of the floor by means of blade coating, brush coating, roller coating, spray coating and the like, the thickness of a coating dry film is about 60 μm, and the coating is dried and cured for 24 hours at normal temperature to obtain an easy-to-clean antiskid wear-resistant floor coating with smooth transition micro-protrusions.

The obtain easy-to-clean antiskid wear-resistant floor coating has grade 0 pulverization, grade 0 crack and color difference Δ E=0.24 after artificial accelerated aging for 1000 hours; Contamination resistance (use No. 15 hydraulic oil: carbon black=10:1, place for 24 h, then clean for 2 min), no visible pollutant residue; Wear resistance: 0.023 g/1000 g·10000 r; Coefficient of sliding friction: 0.87 with artificial leather, 0.79 with rubber.

The embodiments of the present invention have been described above, but the present invention is not limited to the specific embodiments described above, which are only illustrative rather than limitative, and those skilled in the art can make various modifications without departing from the spirit and scope of the invention as claimed, all of which fall within the scope of the present invention.

The invention claimed is:

1. An antiskid wear-resistant floor coating, comprising a coating component and a curing agent component; wherein the mass ratio of the coating component to the curing agent component is 100:45-70;
    the coating component comprises the following raw materials in parts by mass:
    40-60 parts of polyaspartic acid ester,
    20-40 parts of polyester polyol or polyether polyol,
    0.3-0.6 parts of reactive catalyst,
    40-60 parts of solvent,
    1-3 parts of hydrophilic anti-staining agent,
    0.1-0.2 parts of ultraviolet absorbent,
    0.1-0.2 parts of heat stabilizer,
    20-30 parts of elastic microspheres,
    2-4 parts of flame retardant,
    3-6 parts of mildew inhibitor,
    1-3 parts of anti-settling agent,
    0.4-0.6 parts of defoaming agent,
    0.4 to 0.6 parts of leveling agent, and
    10-20 parts of filler;
    the curing agent component comprises the following raw materials in parts by mass:
    100 parts of isocyanate prepolymer and
    3-6 parts of polyisocyanate.

2. The antiskid wear-resistant floor coating of claim 1, wherein the number average molecular weight of the polyaspartic acid ester is 400-600, and the number average molecular weight of the polyester polyol is 1000-6000.

3. The antiskid wear-resistant floor coating of claim 1, wherein the reactive catalyst is one of triethanolamine and dimethylethanolamine; the solvent is one or more of xylene, butyl acetate, acetone, butanone and toluene; the hydrophilic anti-staining agent is polyether modified polysiloxane; the ultraviolet absorbent is a hydroxyphenol benzotriazole absorbent; the heat stabilizer is a hindered phenol antioxidant; the flame retardant is a phosphate additive flame retardant; the mildew inhibitor is isothiazolinone bactericidal mildew inhibitor; the anti-settling agent is organic soil; the defoaming agent is a polysiloxane defoaming agent; and the leveling agent is polyacrylate.

4. The antiskid wear-resistant floor coating of claim 1, wherein the elastic microspheres are polyurethane elastic microspheres, and the particle size of the polyurethane elastic microspheres is 70-100 μm.

5. The antiskid wear-resistant floor coating of claim 4, wherein the method for preparing the elastic microspheres comprises:
   (A1) gradually adding polytetrahydrofuran ether into isophorone diisocyanate, heating to 70-80° C. after the temperature is stable, adding dimethylolpropionic acid after the reaction is completed under stirring, continuing the reaction until the reaction is completed, cooling to normal temperature, adding triethylamine, and stirring for 15 minutes to obtain self-emulsifying polyurethane prepolymer;
   (A2) stirring deionized water and the ethylenediamine uniformly, and adding the self-emulsified polyurethane prepolymer prepared in the step (A1) gradually to obtain polyurethane emulsion;
   (A3) adding a calcium chloride solution with a concentration of 10% into the polyurethane emulsion prepared in the step (A2) to cause the polyurethane emulsion particles to aggregate and precipitate, and drying to obtain the elastic microspheres.

6. The antiskid wear-resistant floor coating of claim 1, wherein the isocyanate prepolymer is prepared by reacting aliphatic diisocyanate and dihydric alcohol polymer under heating condition, and the aliphatic diisocyanate is one or more of dicyclohexylmethane diisocyanate and isophorone diisocyanate; the diol polymer is one or more of polyether diol and polyester diol; the number-average molecular weight of the diol polymer is 600-2000, and the mass ratio of aliphatic diisocyanate to the diol polymers is 1:(1.2-1.8).

7. The antiskid wear-resistant floor coating of claim 6, wherein the NCO content of the isocyanate prepolymer is 8%-12%.

* * * * *